Patented May 5, 1942

2,282,264

UNITED STATES PATENT OFFICE 2,282,264

PROCESS OF PRODUCING SUBSTANCES HAVING TANNING ACTION

Edmund Stiasny, Nya Kungshult, Helsingborg, Sweden, and Hermann Schuette, Mannheim, Germany, assignors, by mesne assignments, to General Aniline & Film Corporation, New York, N. Y., a corporation of Delaware No Drawing. Application March 8, 1939, Serial No. 260,504. In Germany March 17, 1938

6 Claims. (Cl. 260—42)

This invention relates to new substances having tanning action and a process of producing same.

In application Ser. No. 182,158 filed on December 28, 1937, now U. S. Patent 2,191,818 issued February 27, 1940, in the name of Edmund Stiasny there is described a process for the production of substances having tanning action, according to which sulphonic acids of polynuclear aromatic hydrocarbons, if desired, in admixture with other aromatic sulphonic acids, are treated with urea and formaldehyde. The resulting products, when they are insoluble or insufficiently soluble, are rendered water-soluble by the action of aromatic sulphonic acids such as phenol sulphonic acids, cresol sulphonic acids or anthracene sulphonic acids and formaldehyde or condensation products obtainable therefrom.

We have now found that especially valuable products can be obtained by using omega-methylsulphonic acids of aromatic, advantageously hydroxyl-group-containing, polynuclear compounds in the treatment of the sulphonic acids of polynuclear aromatic hydrocarbons with urea and formaldehyde according to the first stage of the said process and/or in the treatment for the purpose of increasing solubility according to the second stage of the said process, together with the other aromatic sulphonic acids. As components of the said kind there may be mentioned the addition products of formaldehyde bisulphite with 4.4′-dihydroxydiphenyl-sulphone or 4.4′-dihydroxydicresyl-sulphones or beta-beta-di(hydroxyphenyl)-propane, and also with condensation products of phenol and methyl ethyl ketone, phenol and acetophenone, phenol and cyclohexanone, and ortho-cresol and acetone.

For the rest, the initial materials to be used are the same as in the said process, and the working conditions are substantially the same.

The products obtainable according to this invention may be used as tanning agents either directly or after neutralization to a suitable degree of acidity. They are distinguished by high tanning action and yield white leather of good body and excellent stability to light.

The following examples will further illustrate how the said invention may be carried out in practice but the invention is not restricted to these examples. The parts are by weight.

Example 1

30 parts of the addition product of formaldehyde bisulphite and 4.4′-dihydroxydiphenyl-sulphone and also 12 parts of urea are dissolved hot in a solution of 30 parts of crude naphthalene sulphonic acid in 30 parts of water. At 50° C. there are added 24.5 parts of a 30 per cent formaldehyde solution and then 40 parts of a sulphonic acid mixture obtained by sulphonation of a phenol mixture arising from the hydrogenation of coal and 50 parts of the addition product of formaldehyde bisulphate and 4.4′-dihydroxydiphenyl-sulphone are added. The mixture is heated at from 80° to 90° C., cooled to about 25° C., 13.7 parts of 30 per cent aqueous formaldehyde solution are added and the whole heated at from 60° to 70° C. for ¼ hour. It is then neutralized with 12.5 parts of soda, a tanning agent thus being obtained which yields leather which is very stable to light and of good body.

Example 2

180 parts of crude-naphthalene sulphonic acid (obtained by sulphonating naphthalene with an equal weight of 98 per cent sulphuric acid), together with 276 parts of the addition product of formaldehyde bisulphate and beta-beta-di(hydroxy-phenyl)propane and 72 parts of urea are dissolved hot in 180 parts of water. At 50° C. there are gradually added 145 parts of 30 per cent formaldehyde, 240 parts of cresol sulphonic acid and 455 parts of the addition product of formaldehyde bisulphite and beta-beta-di(hydroxyphenyl)propane. The mixture is heated to from 80° to 90° C. After cooling to 25° C., 83 parts of 30 per cent formaldehyde are added and the whole heated for 2 hours at from 60° to 70° C. By neutralization with 108 parts of 25 per cent ammonia, a tanning agent is obtained which yields a leather stable to light.

What we claim is:

1. The process for the production of substances having tanning action, which comprises treating a sulphonic acid of a polynuclear aromatic hydrocarbon and an addition product of formaldehyde bisulfite on an aromatic compound corresponding to the formula R—X—R wherein each R stands for a phenyl radical bearing an hydroxyl group and X stands for a bridge selected from the group consisting of

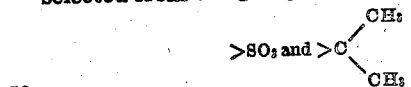

with urea and formaldehyde and improving the water-solubility of the product obtained by a treatment with an addition product of the aforesaid kind and an aromatic sulphonic acid selected from the class consisting of phenol sulphonic acids and cresol sulphonic acids and formaldehyde.

2. The process for the production of substances having tanning action, which comprises treating a sulphonic acid of a polynuclear aromatic hydrocarbon and an addition product of formaldehyde-bisulphite on a dihydroxy diaryl sulphone with urea and formaldehyde and improving the water-solubility of the product obtained by a treatment with an addition product of formaldehyde-bisulphite on a dihydroxy diaryl sulphone and with an aromatic sulphonic acid selected from the class consisting of phenol sulphonic acids and cresol sulphonic acids and formaldehyde.

3. The process for the production of substances having tanning action, which comprises treating a sulphonic acid of a polynuclear aromatic hydrocarbon and an addition product of formaldehyde-bisulphite on β·β-di(hydroxyphenyl)propane with urea and formaldehyde and improving the water-solubility of the product obtained by a treatment with an addition product of formaldehyde-bisulphite on β·β-di(hydroxyphenyl)propane and with an aromatic sulphonic acid selected from the class consisting of phenol sulphonic acids and cresol sulphonic acids and formaldehyde.

4. Products from the reaction of a sulphonic acid of a polynuclear aromatic hydrocarbon and an addition product of formaldehyde bisulfite on an aromatic compound corresponding to the formula R—X—R wherein each R stands for a phenyl radical bearing an hydroxyl group and X stands for a bridge selected from the group consisting of $$>SO_2 \text{ and } >C\begin{smallmatrix}CH_3\\CH_3\end{smallmatrix}$$

urea and formaldehyde, after-treated with an addition product of the aforesaid kind and an aromatic sulphonic acid selected from the class consisting of phenol sulphonic acids and cresol sulphonic acids and formaldehyde.

5. Products from the reaction of a sulphonic acid of a polynuclear aromatic hydrocarbon and an addition product of formaldehyde-bisulphite on a dihydroxy diaryl sulphone, urea and formaldehyde, after-treated with an addition product of formaldehyde-bisulphite on dihydroxy diaryl sulphone and an aromatic sulphonic acid selected from the class consisting of phenol sulphonic acids and cresol sulphonic acids and formaldehyde.

6. Products from the reaction of a sulphonic acid of a polynuclear aromatic hydrocarbon and an addition product of formaldehyde-bisulphite on β·β-di(hydroxyphenyl)propane, urea and formaldehyde, after-treated with an addition product of formaldehyde-bisulphite on β·β-di(hydroxyphenyl) propane and an aromatic sulphonic acid selected from the class consisting of phenol sulphonic acids and cresol sulphonic acids and formaldehyde.

EDMUND STIASNY.
HERMANN SCHUETTE.